United States Patent [19]

Dawn et al.

[11] Patent Number: 4,926,650
[45] Date of Patent: May 22, 1990

[54] REFRIGERANT FLUID AND METHOD OF USE

[75] Inventors: Douglas D. Dawn, Pasadena, Calif.; Reinhard Radermacher, Kensington, Md.

[73] Assignee: Pennwalt Corporation, Philadelphia, Pa.

[21] Appl. No.: 195,704

[22] Filed: May 18, 1988

[51] Int. Cl.$^5$ .................... F25B 13/00; C09K 5/00
[52] U.S. Cl. .................................... 62/114; 252/67
[58] Field of Search ........................... 252/67; 62/114

[56] References Cited

U.S. PATENT DOCUMENTS

| | | | |
|---|---|---|---|
| 3,583,921 | 6/1971 | Healy et al. | 252/90 |
| 4,003,215 | 1/1977 | Roach | 62/476 |
| 4,174,295 | 11/1975 | Bargigia et al. | 252/305 |
| 4,428,853 | 1/1984 | Ramet et al. | 252/67 |
| 4,680,939 | 7/1987 | Rojey et al. | 62/114 |
| 4,771,824 | 9/1988 | Rojey et al. | 62/114 |

OTHER PUBLICATIONS

Derwent Abstracts, an 73-29829u/21, "Non-Sting Aerosol Antiseptic Spray", South African Pat. No. 71/4450, 1971.

L. J. Wilson et al., Chem. Wk., pp. 15-16 (Jul. 22, 1978) "Pennwalt's Aerosol Replacement is Cool".

H. P. Picht, Hungarian J. of Ind. Chem., 12: 91-96 (1984).

*Primary Examiner*—Paul Lieberman
*Assistant Examiner*—Christine A. Skane
*Attorney, Agent, or Firm*—Howson & Howson

[57] ABSTRACT

A refrigerant fluid and system containing and utilizing such fluid in which the fluid consists essentially of a mixture of trichloromonofluoromethane and 1-chloro-1,1-difluoroethane.

4 Claims, No Drawings

REFRIGERANT FLUID AND METHOD OF USE

The present invention relates to a novel refrigerant fluid and to refrigeration systems employing the novel fluid.

BACKGROUND OF THE INVENTION

In refrigeration systems, such as air conditioners and heat pumps, a refrigerant fluid is subjected to at least one basic vapor compression cycle. Briefly described, a basic vapor compression cycle involves a series of manipulations of a refrigerant fluid. First, the fluid is evaporated in an evaporator in a heat exchange relationship with a medium being cooled. Compression of the vaporized fluid occurs in a compressor, and the fluid is condensed in a condenser in heat exchange relation to a cooling medium or medium being heated. Then expansion of the fluid occurs in an expansion valve. Since cooling in this cycle also results in the production of heat, the system can be utilized for cooling or for heating as in a heat pump. Typical refrigeration systems may consist of a simple vapor compression cycle or more than one cycle, such as a compound cycle.

Increase in volumetric capacity, improvement in energy efficiency, and decrease in compression ratio are continuously sought in such refrigeration systems. In large, low pressure systems with high flow rate, and low pressure ratios, centrifugal compressors are preferred (see ISA Monograph Series No. 3, "Centrifugal Compressors", A. Eli Nisenfeld, 1982, page 15). Compared to reciprocating compressors, the centrifugal compressors offer a combination of lower maintenance costs, greater rangeability and less vibration.

In centrifugal chilling systems which usually use conventional refrigerant fluids, the larger the volumetric capacity of a refrigerant employed, the smaller, and generally more economical, the system. Energy efficiency is measured as coefficient of performance (COP), that is, the ratio of cooling provided by the evaporator, divided by the energy input to the compressor of the cycle. Higher energy efficiency is desirable as this parameter compares the required energy input of different systems for a given amount of heating or cooling. A higher energy efficiency means a lower operating cost. Lower compression ratios are also desirable since, generally, the greater this parameter the less efficient is a compressor's operation.

While new designs in hardware continually improve these parameters in specific applications, hardware designers have been limited to a few well characterized and commercially available refrigerant fluids. Such fluids are trichloromonofluoromethane (conventionally called Isotron ® 11, CFC 11 or R11), monochlorodifluoromethane (Isotron 22 or R22) dichlorodifluoromethane (Isotron 12 or R12), 1-chloro-1,1-difluoroethane (Isotron 142b or R142b), and 1,2-dichloro-1,1,2,2-tetrafluoroethane (Isotron 114 or R114).

These refrigerants have proven less than satisfactory primarily because the most popular fluids for use in refrigerant systems, such as automobile air conditioners, are the fully halogenated refrigerants, such as trichloromonofluoromethane (R11) and 1,2-dichloro-1,1,2,2-tetrafluoroethane (R114). These compounds have serious destructive effects on stratospheric ozone which filters carcinogenic ultraviolet radiation. Consequently, the art has focused its attention to producing new refrigerant fluids to minimize such harm, yet achieve the satisfactory results of the fully halogenated fluids. See, e.g., L. J. Wilson, Chemical Week, pp. 15–16 (July 22, 1987).

SUMMARY OF THE INVENTION

As one aspect of the present invention, there is provided a novel refrigerant fluid mixture which consists of trichloromonofluoromethane (R11) and 1-chloro-1,1-difluoroethane (R142b), in which the latter compound is present in an amount between about 12 and about 92 mol %, based on the combination of the two components present in the fluid mixture. In another aspect, the present invention provides a refrigerant mixture which includes the novel mixture described above in combinations with additional conventional refrigerants and additives.

In still a further aspect the invention provides a novel refrigeration system utilizing the novel refrigerant fluids.

Other aspects and advantages of the compositions and improved refrigeration systems of the present invention are disclosed in the following detailed description containing illustrations of the invention.

DETAILED DESCRIPTION OF PREFERRED EMBODIMENTS

The novel refrigerant compositions of the present invention possess one or more improved characteristics selected from the three parameters of volumetric capacity, energy efficiency and compression ratio. The novel refrigerant fluid is also characterized by less detrimental effects on stratospheric ozone, and may be used in heat pumps, refrigeration systems, air conditioning systems and the like. The refrigerant fluid of the present invention is also zeotropic (non-azeotropic). It increases volumetric capacity and energy efficiency while decreasing the compression ratio in typical applications otherwise using either fully halogenated fluids such as trichloromonofluoromethane alone or 1,2-dichloro-1,1,2,2-tetrafluoroethane alone.

According to this invention, the proportion of 1-chloro-1,1-difluoroethane in a refrigerant mixture will range from about 12 to about 92 mol % of the total combination of R11 and R142b present. The selection of the proportion depends upon the individual design of the refrigeration system. For example, in centrifugal compression systems, the amount of R142b will depend upon whether the impeller alone can generate sufficient pressure rise for a selected proportion of 1-chloro-1,1-difluoroethane, or whether more or less R142b should be adjusted in the mixture to provide appropriate pressure levels. Selection of appropriate pressure levels in refrigeration systems is a task obvious to one of skill in this field.

At a maximum of 92% molar weight of R142b, the volumetric capacity and compression ratios of the refrigerant fluid composition of the present invention are maximized. However, a presently preferred maximum proportion of 1-chloro-1,1-difluoroethane, especially in refrigeration compositions and systems otherwise using either trichloromonofluoromethane or 1,2-dichloro-1,1,2,2-tetrafluoroethane alone, is 80 mol %. The advantages offered by proportions over 80 mol % in the mixture of the present invention may be offset by the increased hazard of flammability.

Another preferred mixture according to the invention contains a maximum of 70% molar weight of R142b. The energy efficiency of the present refrigerant is at or near its maximum with proportions of 1-chloro- 1,1,-difluoroethane between about 12 and about 70 mol % thereof based on the combination of it and trichloromonofluoromethane. In this range, the mixture is nonflammable. Within this desired range, it is further preferred to adjust the proportions of 1-chloro-1,1- difluoroethane to at least about 40 mol %, to balance a desired minimum potential ozone-depleting effect of the blend, with a maximum volumetric capacity and minimum compression ratio.

The novel fluid of the invention may also be utilized in combination with additional conventional refrigerant fluids of choice, like trichloromonofluoroethane and 1,2-dichloro-1,1,2,2-tetrafluoroethane, and with possible modification in design and/or operation of a refrigeration system as the result of improvements resulting from its use.

The novel refrigerant compositions of the invention are particularly useful in refrigeration systems utilizing a centrifugal compressor. Thus as another aspect, there is provided an improved refrigeration system involving a vapor compression cycle with the steps of evaporation, compression, condensation and expansion of a refrigerant fluid. The improved feature of the systems is the addition thereto of the novel compositions.

The present composition may be charged to a selected refrigeration system as the composition described above. However, it is not necessary that the present composition be charged to a refrigerant system as the complete mixture of the two components. Alternatively, a mixture rich in one component and lean in the other may be initially charged to the system, followed by later addition of the lean component to provide the final, desired composition. In another aspect, only one of the components may be charged to the system, following which the other component, may be added to provide the final, desired mixture of the invention.

The invention will be more readily understood from a consideration of the following example which is provided for the purpose of illustration only and is not to be considered as limiting the scope of the invention in any way.

EXAMPLE

A 50/50 mol/(mol blend) of trichloromonofluoromethane and 1-chloro-1,1-difluoroethane, a refrigerant fluid according to the invention, is compared with other refrigerants in an application typical of a centrifugal chiller which normally utilizes trichloromonofluoromethane alone as the refrigerant.

A modified Carnahan-Starling-Desantis (C-S-D) equation of state [National Bureau of Standards Technical Note #1226 (1986)] is used with computer programs which were developed at the National Bureau of Standards to run these tests. The programs were based on the C-S-D Equation to calculate all relevant thermodynamic properties. These properties were calculated for a number of fluids, assuming a simple vapor compression cycle consisting of a condenser, compressor, evaporator and expansion valve in series, fluid flow communication with means for introducing fluid to be cooled to the evaporator, means for removal of the cooled fluid therefrom, means for introducing fluid to be heated to the condenser, and means for removal of the heated fluid therefrom.

When blends are considered, the C-S-D equation is modified to be applicable to a binary fluid mixture by including an interaction parameter which is independent of relative concentrations of the binary pair. The interaction parameter is determined by correlation of experimental data of the mixture. The values of all interaction parameters determined so far, range between −0.1 to +0.12. As a first approximation, an "average" value for the interaction parameter of 0.03 can be assumed for the mixture under study for the purpose of computer modeling.

With the C-S-D Equation and basic heat transfer equations, the inputs to the program are the coefficients to the equation of state of the particular refrigerant fluid and the temperatures of the inlet and outlet of the fluid stream to be heated and the temperatures of the fluid stream to be cooled. For the present example, inlet temperature of the fluid stream to be heated is 308.2K, and outlet temperature is 316.2K. Temperatures of the inlet and outlet of the fluid stream to be cooled are 295.2K and 283.2K, respectively. The output includes pressure, temperature and specific volume at the points: between the condenser and the compressor, between the compressor and the evaporator, between the evaporator and the expansion valve and between the expansion valve and the condenser. The volumetric capacity (related to enthalpy change in the evaporator per volume of fluid vapor), the coefficient of performance (COP), and the pressure ratio are also calculated.

The results are set forth in the following Table. The refrigerants are identified in the first column under "Charge" by their conventional numbers. All blends are 50/50 mol/mol mixtures. In the second column the energy efficiency is listed as COP, followed by the compression ratio and volumetric capacity. All values are given in relative terms as fractions of the ratio of the parameter of the particular refrigerant to that of the novel refrigerant, R142b/R11.

TABLE

Relative COP, Compression Ratio and Volumetric Capacity of Refrigerants Compared to Present Refrigerant, R142b/R11

| Charge | COP | Compression Ratio | Volumetric Capacity |
|---|---|---|---|
| R142b/R11 | 1.00 | 1.00 | 1.00 |
| R12/R11 | .90 | 1.09 | 1.22 |
| R22/R11 | .70 | 1.51 | 1.42 |
| R114/R11 | .93 | 1.08 | .70 |
| R152a/R11 | .91 | 1.11 | 1.28 |
| R12/R113 | .63 | 2.14 | .66 |
| R114/R113 | .95 | 1.17 | .52 |
| R142b/R113 | .84 | 1.40 | .62 |
| R113/R11 | .97 | 1.17 | .38 |
| R113/R22 | .52 | 3.25 | .70 |
| R114 | .85 | 1.07 | .86 |
| R113 | .90 | 1.39 | .21 |
| R11 | .92 | 1.19 | .50 |

R11 = trichloromonofluoromethane
R12 = dichlorodifluoromethane
R22 = monochlorodifluoromethane
R113 = 1,1,2-trichloro-1,2,2-trifluoroethane
R114 = 1,2-dichloro-1,1,2,2-tetrafluoroethane
R142b = 1-chloro-1,1-difluoroethane
R152a = 1,1-difluoroethane From the foregoing Table it is seen that the present refrigerant (R142b/R11) has the highest energy efficiency (as COP), the lowest compression ratio and a relatively high volumetric capacity. It has a volumetric capacity twice that of trichloromonofluoromethane. The energy efficiency is improved by 9% and the compression ratio is reduced by 14% over the identical system based on trichloromonofluoromethane alone. Relative results were similar for temperatures of applications other than those set forth in the previous Table.

A critical advantage of use of the mixture of the present invention is its significantly reduced destructive impact on the ozone layer. Replacing any amount of a conventional refrigerant, like trichloromonofluoromethane or 1,2-dichloro-1,1,2,2-tetrafluoroethane, with the present blend containing 1-chloro-1,1-difluoroethane is environmentally preferred. In the novel mixture, this compound has a shorter lifetime in lower atmosphere. Thus, less of the fluorocarbon is finally transported to the ozone layer. In addition, because of the other advantages of the present refrigerant, a lesser total amount of refrigerant may be used. The toxicology of 1-chloro-1,1-difluoroethane is acceptable and in a competitive range with other commercial refrigerants. These advantages should thereby encourage its use in place of the more toxic refrigerant fluids.

Numerous modifications of the novel mixture and its use may be made by those of skill in the art. For example, additional conventional additives or unpreventable pollutants may ultimately form part of the mixture. Newly devised refrigerants in addition to conventional refrigerants may be added to the mixture. Such modifications are expected to be encompassed by the appended claims.

What is claimed is:

1. In a system involving a vapor compression cycle comprising evaporation, compression, condensation and expansion of a refrigerant fluid, the improvement comprising using, as the refrigerant fluid in said system, a fluid comprising a first amount of trichloromonofluoromethane; and a second amount of 1-chloro-1,1-difluoroethane, said second amount comprising between about 12 and 92 mol % based on the combination of the first and second amounts.

2. The system of claim 1 wherein said amount of 1-chloro-1,1-difluoroethane is less than about 80 mol %.

3. The system of claim 1 wherein said amount of 1-chloro-1,1-difluoroethane is less than about 70 mol %.

4. The system of claim 1 wherein said amount of 1-chloro-1,1-difluoroethane is at least about 40 mol %.

* * * * *